Figure 1:
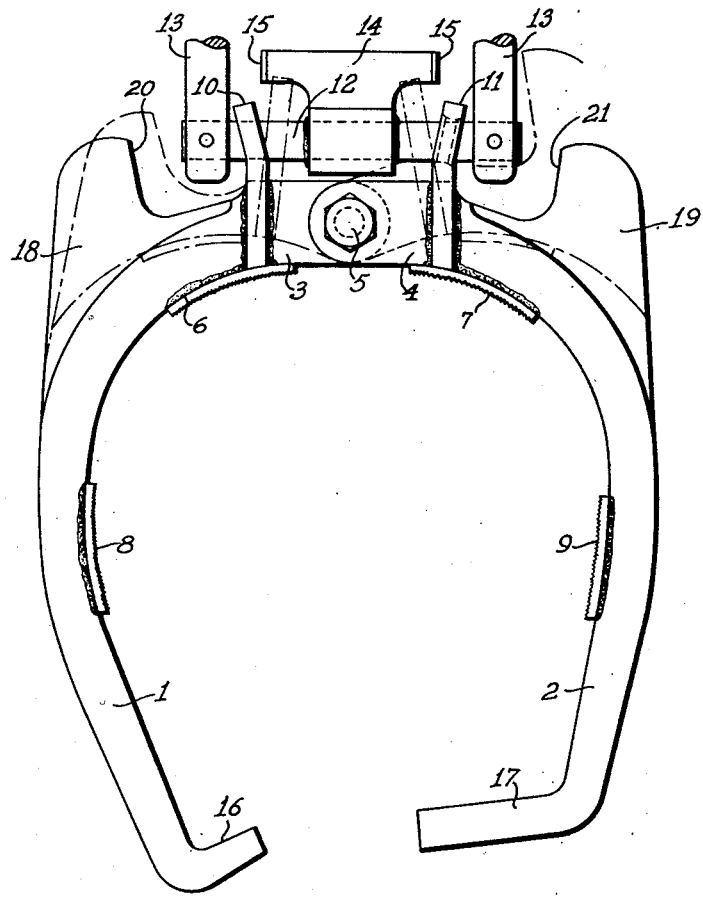

Nov. 21, 1944.  A. P. BUQUOR  2,363,392
CLAMPING DEVICE
Filed Dec. 14, 1942  2 Sheets-Sheet 1

Inventor
ADOLPH PASCHAL BUQUOR

By  Bacow & Thomas
Attorneys

Nov. 21, 1944. A. P. BUQUOR 2,363,392
CLAMPING DEVICE
Filed Dec. 14, 1942 2 Sheets-Sheet 2

Inventor
ADOLPH PASCHAL BUQUOR

By Bacon + Thomas
Attorneys

Patented Nov. 21, 1944

2,363,392

UNITED STATES PATENT OFFICE 2,363,392

CLAMPING DEVICE

Adolph Paschal Buquor, Washington, D. C.

Application December 14, 1942, Serial No. 469,031
In Great Britain April 4, 1941

2 Claims. (Cl. 294—116)

This invention relates to improvements in or relating to clamps or gripping devices and more particularly, though not necessarily exclusively, to clamps or gripping devices suitable for application to the wheels of vehicles.

It is sometimes difficult or impossible to move a vehicle over an obstacle or out of a mud hole or over snow or mud-covered ground by pulling on the vehicle itself and it is a common expedient to manhandle the wheels in an effort to move a vehicle in such circumstances. In many cases it is impossible to move the vehicle even when manhandling the wheels, this being a common experience when dealing for example with heavy vehicles or heavily loaded vehicles such as gun carriages, ammunition wagons or the like which are deeply bogged in mud. It is one of the objects of the present invention to provide a simple and efficient form of clamp, grip, or the like capable of being easily and quickly applied to one or more of the wheels of a vehicle to be moved so that by connecting a tow rope or the like to the grip or the like a two to one purchase can be exerted and the rope can be pulled mechanically, or manually by any number of men.

A grip, clamp or the like according to the present invention comprises two pivotally mounted or pivotally interconnected arms and an adjustable member adapted in one position to lock said arms in a gripping or clamping condition and in another position to permit said arms to be moved into a releasing condition.

The aforesaid adjustable member preferably cooperates with the aforesaid arms in such a way that as it is urged into the said locking position it automatically urges said arms towards one another.

The aforesaid adjustable member may for example consist of a bar, cam member or the like adapted to be swung between inclined surfaces extending from the two arms so that during the locking movement the two arms are moved with respect to one another or the said means may consist of a bar, cam member or the like which co-operates with an inclined surface extending from only one of the arms.

The aforesaid adjustable member is advantageously attached to or formed integrally with a link which serves as a handle for the clamping device and which also serves as a point to which lifting or hauling tackle may be attached. In this way the device can be urged into and/or locked in its clamping position automatically by the pull in the hauling or lifting tackle. In order to attain this automatic operation irrespective of the particular direction in which a pull is applied the aforesaid link or handle may be mounted so that it can swing in both clockwise and anti-clockwise directions and the adjustable member may be so disposed that it is effective irrespective of the direction in which the said link is swung.

The aforesaid arms are preferably of arcuate form so that they can for instance be applied around the rim or tire and rim of a wheel and such arms may be of similar or dissimilar shape. We find for instance that in some cases it is advantageous to employ a device of asymmetric form dependent upon the particular purpose for which the device is required, but it is also within the scope of the present invention to provide a device of symmetrical form.

The aforesaid arms may be of flat, cylindrical or other suitable cross-section. If desired plates may extend laterally across the arms so as to provide an increased area of contact with any object to be gripped by the device and said plates may have a smooth, irregular or resilient surface as may be most suitable for the work concerned. In the case, for instance, of a device for application to a wheel having a pneumatic tire a plate may extend across the inner end of one arm or across the inner end of each and be adapted to rest on the tread of the tire and further plates may extend from both arms at about their midpoints for engagement with the side walls of the tire, the lowermost ends of the arms being inturned if desired for making direct contact with the inner periphery of the wheel rim.

The aforesaid arms may be provided with plates extending in planes parallel with the plane in which said arms are pivoted and be adapted to slide over one another during pivotal movement of the arms in order to guide said arms in their movement and oppose any likelihood of their becoming twisted or distorted. In many cases however such additional plates are unnecessary particularly if there is a large area of contact between the two arms.

The respective arms of a device according to the present invention are preferably of an integral nature and consist for example of forgings, and moreover, the above-mentioned plates, if provided, for co-operation with the body to be gripped and/or for guiding the respective arms are preferably also formed integrally with said arms.

Figure 2:
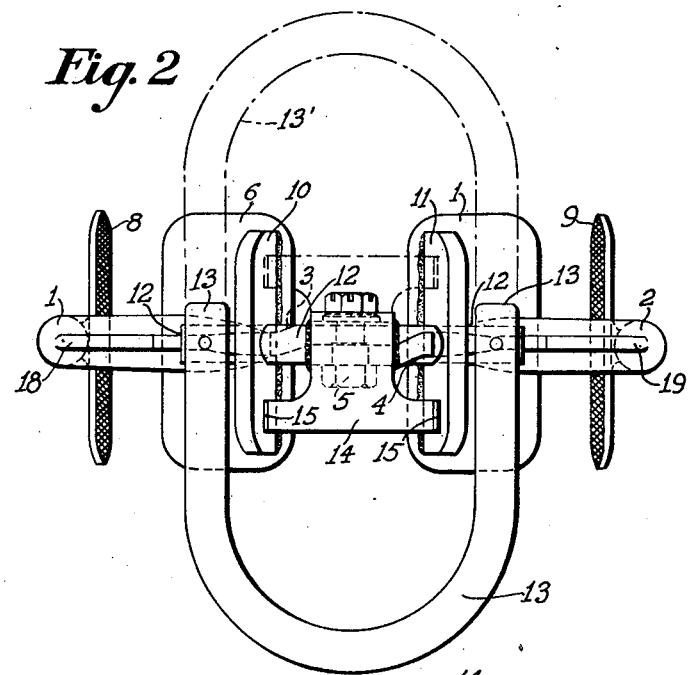
Figure 3:
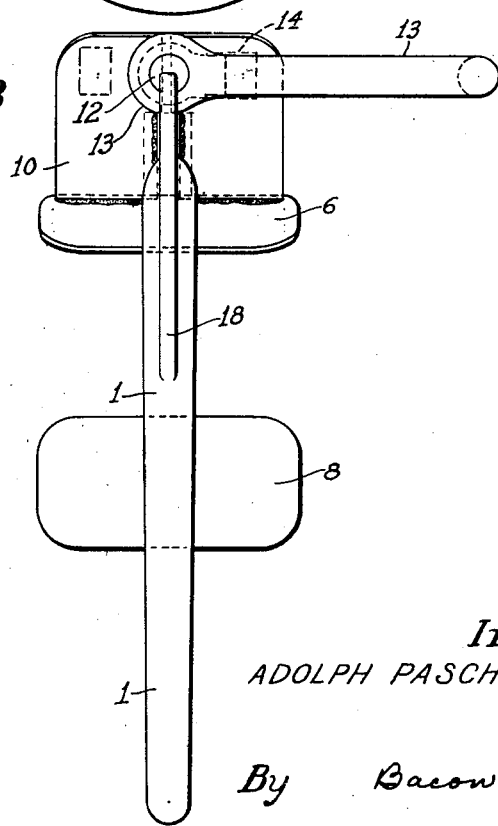

In order that the present invention may be well understood we will now describe, by way of example only, one embodiment thereof with reference to the accompanying drawings in which:

Figure 1 is a front elevation of the device with the control element in its freed position, Figure 2 is a plan view of the device shown in Figure 1 but with the control element in its locking position, and Figure 3 is a side elevation of the device again showing the locking element in its locking position.

The grip shown in the drawings is suitable for application to the wheels of a vehicle for instance for facilitating movement of such vehicle when it is bogged in deep mud and includes two pivotally interconnected arcuate arms 1 and 2 shaped so that when in their closed positions they more or less follow the contour of the cross-section through the tire and wheel rim of the vehicle concerned.

The arms 1 and 2 are for instance of circular cross-section over the major parts of their length and have flattened end portions 3 and 4 respectively through which a pivot bolt or rivet 5 extends, such flattened portions preferably making contact with one another over a relatively large area in order to oppose any relative twisting movements of the arms.

A plate 6 extends transversely across the arm 1 adjacent to the upper end thereof and a similar plate 7 extends across the arm 2. These plates 6 and 7 are adapted to rest on the tread of the tire to which the grip is applied, thus properly locating the grip and protecting the tire from damage. Further plates 8 and 9 extend transversely across the arms 1 and 2 for instance at about their mid points and these are adapted to make good surface contact with the side walls of the tire to protect such walls from being damaged. The aforesaid plates 6, 7, 8 and 9 are preferably forged integrally with the associated arms but they may be formed separately and secured thereto by welding or in any convenient manner giving the desired strength and rigidity.

Two lugs 10 and 11 extend upwardly from the respective arms 1 and 2 and are preferably formed integrally with said arms and the associated plates although they may be formed separately and may be secured in the positions shown by welding or in any other suitable manner. These lugs are provided with apertures adapted to receive a cross-bar 12 to which is connected a stirrup or link 13 forming a handle for the device, the arrangement being such that such link can be swung in a plane at right angles to the plane of movement of the arms 1 and 2 and the lugs 10 and 11 can slide along the crossbar 12.

A cam member 14 is forged integrally with said cross-bar 12 or welded or otherwise secured thereto and is so positioned that when the link or handle is swung into a position in alignment with the arms 1 and 2, i. e. into the position shown in Figure 1, it is outside the path of movement of the lugs 10 and 11. When, however, said link or handle is swung in either direction from said position of alignment, i. e. into the position shown in full lines in Figures 2 and 3 or in dash-dot lines designated 13' in Figure 2 the cam member 14 passes between the said lugs 10 and 11 thus preventing the latter from moving towards one another and consequently preventing the arms 1 and 2 from moving in an opening direction. The aforesaid lugs 10 and 11 are provided with outer portions which are outwardly splayed with respect to their inner portions, the shape of such lugs being such that there is a convergent space between them when the arms 1 and 2 are in their closed or nearly closed positions for instance in the positions shown in Figure 1, the width of such space at the outer ends of the lugs being slightly greater than the length of the cam member 14 so that when the link or handle 13 is swung downwardly said cam member can enter said space and its continued movement will urge the arms 1 and 2 into their clamping condition. In order to induce a smooth sliding movement the edges of the cam member 14 are preferably bevelled as indicated by reference numeral 15 in Figure 1.

The ends of the arms 1 and 2 are inturned as indicated by numerals 16 and 17 so that they can make engagement with the inner surface of the rim of the wheel to which the device is to be applied. The shape of the arm 2 is such that the end 17 makes good contact with the rim of the wheel at the same time as the plate 9 is pressed manually against the inner side wall of the tire but the arm 1, which is the one for engagement with the outer side of the wheel, is advantageously shaped somewhat differently, e. g. in the manner shown in Figure 1, so that its end 16 can be readily engaged with the wheel rim thus locating the gripping device before the plate 8 necessarily contacts with the outer side of the tire wall. It will be appreciated in this respect that in general the inner arm will be the one which will be first moved into engagement with the wheel to be gripped and it can therefore be easily located substantially in the position which it will occupy after the clamping operation has been completed. On the other hand the arm 1 may encounter considerable resistance to being moved into its final position and it is therefore desirable that the mere locating of the device on the wheel should only require the swinging of that arm inwardly into engagement with the wheel rim, the force required for moving the plate 8 against the outer side wall of the tire being subsequently exerted by swinging the link or handle 13 inwardly.

For the purpose of reinforcing the arm of the above described device any desired webs such for instance as those designated 18 and 19 in the drawings may be provided and these may for instance be forged integrally with the arms. In cases where these webs extend to the upper parts of the arms they may include recesses 20 and 21 in order to prevent opening movement of the arms being obstructed by the handle of the device.

We prefer to provide at least two of the above described devices for each vehicle and these can be packed in the tool kit of such vehicle or can be secured in a flat condition to the side of the vehicle.

Assuming that a vehicle is bogged or has to be drawn over an obstacle, a device as above described is applied to the wheel at a point on the side remote from that facing the direction in which the vehicle is to be moved. In order to apply the device the link or handle 13 is positioned in alignment with the arms, a position which is automatically assumed by allowing the device to hang whilst it is held by the link or handle 13, thus enabling said arms to be separated and passed around the sides of the tire. The arm 2 is hooked around the inner part of the wheel rim and the arm 1 is then swung inwardly so that it engages the outer part of the wheel rim, i. e. the parts are moved into the positions shown in Figure 1. The link or handle 13 is then swung towards the tire tread in the direction in which the wheel is to be rotated so urging the cam member 14 between the inclined parts of the lugs 10 and 11 and the arms 1 and 2 are thereby moved towards one another, i. e. into a position in which they are clamped against the wheel. A tow rope is attached to the link or handle 13 and this can be pulled by any desired number of men or by means of a tractor so enabling the vehicle to be moved against very great opposition. It will be understood that the pull exerted on the link or handle automatically urges the arms of the clamp together, assuming that the gripping device is properly located, so that the gripping action increases with any increase in the pull exerted and any slipping is therefore opposed.

When the wheel has been rotated to an extent resulting in the grip having been moved to a point well in advance of the wheel axle, e. g. after the wheel has turned through nearly one half of a revolution, and assuming that at that stage it is inconvenient or impossible to move the wheel by a direct pull, a second grip is fitted to the wheel rim in a position with respect to the vehicle similar to that originally occupied by the first grip and the tow rope is then applied to said second grip and the wheel is again rotated by a pull on the tow rope. During this second pull the first grip is preferably left on the wheel and therefore moves into contact with the ground and so very greatly increases the wheel grip. Indeed devices according to the present invention may be applied to the driving wheels of a vehicle solely for the purpose of providing the wheel grip necessary for passage over snow or very soft ground.

When it is desired to remove the above described grip it is only necessary to swing the link or handle 13 outwardly towards the position shown in Figure 1, the arms 1 and 2 being freed for being swung apart as soon as the cam member 14 moves from a position between the lugs 10 and 11.

The above described embodiment of the present invention is entirely free from any loose fittings and can therefore be very easily applied. Such device is also inexpensive to produce and of very simple construction. Thus, it need only comprise five separate parts, namely two arms with integrally formed plates and lugs, a cross-bar with an integrally formed cam member, a link or handle connected to said cross-bar and a pivot bolt or rivet. This small number of separate parts can be still further reduced by employing a single bar in place of the parts 12 and 13 and welding the ends of such bars together after assembly. In the latter arrangement in place of the cam member 14 there would be a cam member extending from one side of the link or handle towards the opposed lug, i. e., downward movement of the link or handle would cause the cam member to co-operate with only one lug and there would have to be an abutment for opposing any resultant sliding movement of the second lug.

It will be apparent from the foregoing description that the gripping devices are of simple and inexpensive construction and can be very quickly and easily applied and removed even in the dark, and moreover, no co-operating lugs or the like are required on the wheels. Such devices are therefore particularly available for army vehicles although they have many other applications such for example as for the wheels of commercial vehicles or for hauling timber or clearing debris.

Whilst we have hereinbefore described one form of gripping device according to the present invention we wish it to be understood that the specific details may be varied or modified without departing from the scope thereof. Thus, for example, for the purpose of attaining an automatic clamping operation when a pull is applied to the link or handle a wedge shaped cam member may be caused to pass between lugs extending from the arms and rollers or like anti-friction devices may be provided for assisting the clamping operation. Moreover, the devices may be made of any desired dimensions or from any suitable material. They may, for example, be made from steel and this may be protected against rusting, for instance, by being chromium plated.

I claim:

1. A clamping device comprising two pivotally interconnected arms and an adjustable member adapted in one position to lock said arms in a gripping or clamping condition and in another position to permit said arms to be moved into a releasing condition, said device having a handle associated with said adjustable member, said handle serving as a point of attachment for any desired lifting or hauling tackle and as a means for controlling the movements of said adjustable member, said handle including a U-shaped stirrup and a cross-bar which is pivotally mounted with respect to said arms in a plane at right angles to the plane in which said arms move with respect to one another.

2. A clamping device comprising two pivotally interconnected arms and an adjustable member adapted in one position to lock said arms in a gripping or clamping condition and in another position to permit said arms to be moved into a releasing condition, said device having a handle associated with said adjustable member, said handle serving as a point of attachment for any desired lifting or hauling tackle and as a means for controlling the movements of said adjustable member, said handle including a U-shaped stirrup and a cross-bar which is pivotally mounted with respect to said arms in a plane at right angles to the plane in which said arms move with respect to one another, said adjusting member being in the form of a wedge formed integrally with said cross-bar.

ADOLPH P. BUQUOR.